United States Patent

Hudson, Jr. et al.

[11] Patent Number: 6,000,359
[45] Date of Patent: Dec. 14, 1999

[54] STORAGE VESSEL OVERFILL ALARM

[76] Inventors: James Lee Hudson, Jr., 8007 Alafia Ridge Rd., Riverview, Fla. 33571; Billy Tindol Hudson, 1801 Twin Oaks Cir., Sun City, Fla. 33598

[21] Appl. No.: 08/681,556

[22] Filed: Jul. 23, 1996

[51] Int. Cl.⁶ .................................................. G01F 23/00
[52] U.S. Cl. .......................................... 116/109; 116/110
[58] Field of Search .................................... 116/109, 110, 116/112; 137/213, 558

[56] References Cited

U.S. PATENT DOCUMENTS

| | | | |
|---|---|---|---|
| 2,152,459 | 3/1939 | Biasco | 116/109 |
| 2,233,229 | 2/1941 | Tapp | 116/110 X |
| 2,249,180 | 7/1941 | Scully et al. | 116/110 X |
| 2,309,804 | 2/1943 | Smith | 116/112 X |
| 2,429,280 | 10/1947 | Scully et al. | 116/110 X |

OTHER PUBLICATIONS

NFPA 30A Automotive and Marine Service Station Code 1993 Edition pp. 30A–1—30A–3, 30A–8.

*Primary Examiner*—Hezron Williams
*Assistant Examiner*—Willie Morris Worth
*Attorney, Agent, or Firm*—David Lewis

[57] ABSTRACT

A housing and float assembly allow for vapors or gases displaced during filling storage vessels to be redirected from a normal vent through a vapor or gas activated whistle or alarm without significantly restricting the venting rate of the vessel. The alarm produces a warning for the operator that the storage vessel has reached the predetermined high level to help avoid overfilling of the storage vessel. The device can be fabricated from readily available "off the shelf" parts and mounts into standard pipe threads or on to standard pipe flanges. The device can be provided as a kit to be assembled by the user.

15 Claims, 4 Drawing Sheets

STORAGE VESSEL OVERFILL ALARM

FIELD OF THE INVENTION

This invention relates to a means to cause an alarm to sound by redirecting venting vapors through a whistle device when the liquid level in a closed storage vessel reaches a preset high level.

BACKGROUND ART

In order to avoid overfill of storage vessels by human error, several devices have been invented and employed to alert the person controlling the filling process when the storage vessel is full. Various means such as compressed gas, electrically actuated horns and mechanical devices have been invented to provide the alert. Devices discussed in U.S. Pat. Nos. 2,227,322 and 2,429,280 provide methods of producing an alarm when a float raises a stem to open or close an aperture to allow vapors to pass through a whistle or to cease passing through a whistle. The devices are complex, require special mounting and restrict the venting capacity of the storage vessel.

SUMMARY OF THE INVENTION

This invention provides a means to redirect venting vapor or gas through a whistle device by directly blocking the normal vent and allowing full venting capacity through the whistle. The device is designed to thread into a standard female pipe thread opening or mounting on a standard flange allowing simple installation. The purpose of this invention is to provide the high level alarm with minimal moving parts, minimal restriction of the venting capacity and installation through standard fittings and openings using "off the shelf" parts. The invention can be provided unassembled, as a kit, for assembly by the user.

It is unique from previous inventions in that it redirects the full flow of the venting vapors through the whistle without significant flow restriction. The means employed to redirect the vapors including venting through an annular space are unique. The use of standard pipe threads and flanges for installation and fabrication and assembly from standard "off the shelf" parts is unique from previous inventions. The ability to provide the invention as an unassembled kit is unique.

DESCRIPTION OF INVENTION

The operation of this invention is to redirect the full vapor discharged during filling of a storage vessel through a whistle or alarm when the desired high level is reached. The vapor passing through the whistle or alarm produces an audible signal to alert the operator that the high level has been reached.

Figure 1:
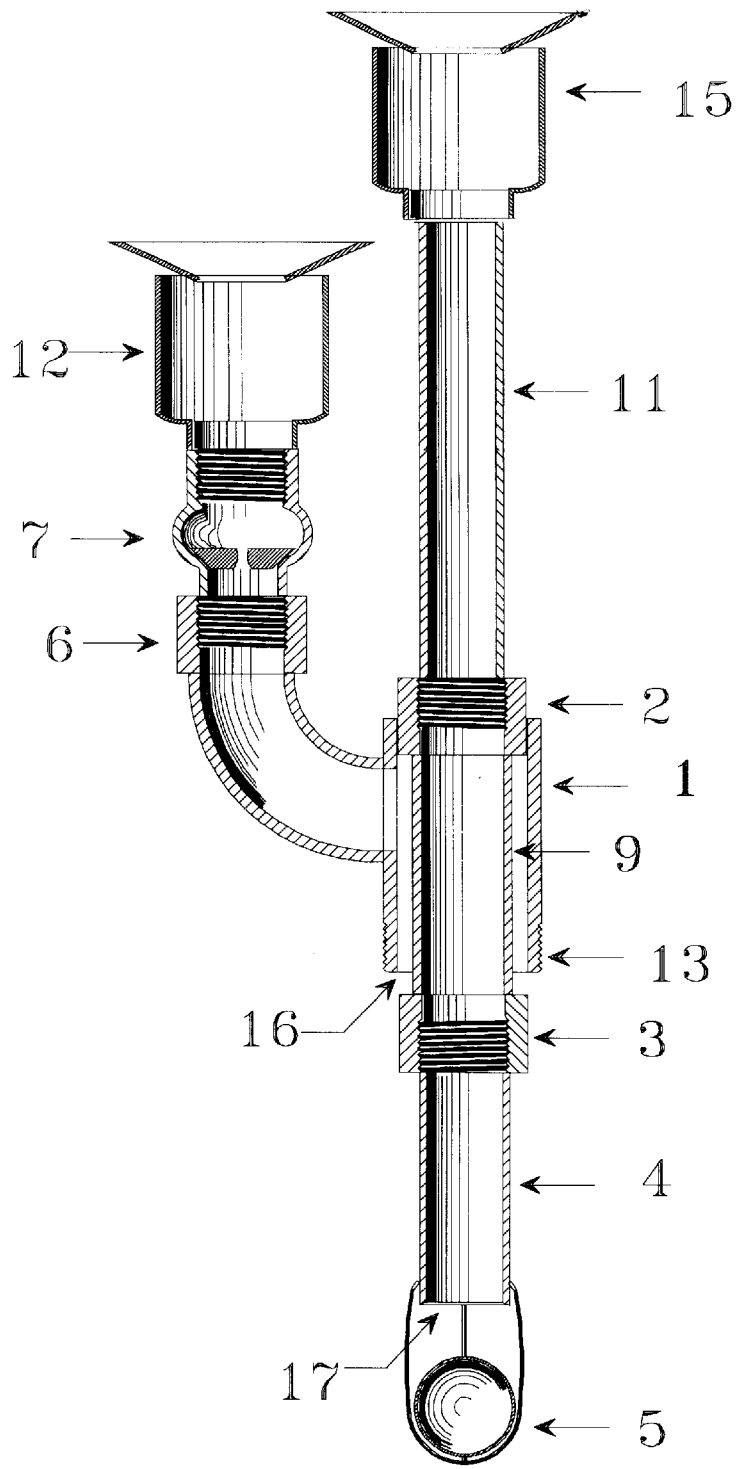
FIG. 1 is a perspective cut away view of the invention in a form for mounting into a standard female pipe opening.

Referring to FIG. 1 which is a form of the invention intended for mounting into a standard female pipe thread, the housing 1 (or any means for rerouting venting vapor) provides for threaded connection at the top 2 (which could be any means to attach threaded pipe) to attach the vent riser 11 (which is a means to extend the vent outlet upwards), a threaded connection at the bottom 3 to attach the float and pipe nipple with seat 4&5 (which could be any means to block vapor flow) and a threaded connection 6 to attach the means of sounding a whistle or alarm 7. Threaded connections 2 & 3 are connected with a pipe section 9. The vent riser 11 is threaded into threaded connection 2. The vent cap 15 (which could be any means to direct discharged vapors upwards and prevent the intrusion of rain water) is mounted on the end of the vent riser 11. Standard pipe threads 13 at the bottom of the housing 1 provide a means to mount the invention on the top of a storage vessel through a standard pipe threaded opening. The invention is installed on the only vent outlet on the vessel so that all vapor displaced during the filling process must pass through it. At lower liquid levels, the vapor exits the vessel through opening 17 through pipe 4, pipe 9, the vent riser 11 and out of the vent cap 15. The length of pipe section 4 determines the preset alarm level. When the liquid level reaches the level of the float 5 (which is a means to block the vapor flow) during filling of the storage vessel, the float 5 rises until it seats at the bottom of pipe nipple 4 preventing the vapor from exiting through opening 17. The vapor overcomes the slight back pressure from the means to sound a whistle or alarm 7 and exits through annular space, ring or annular ring opening 16, through the means to sound a whistle or alarm 7 and out the other vent cap 12. The venting vapor activates the whistle or alarm alerting the operator that the vessel has reached the alarm level. The redirecting of the venting vapors by this method allows full venting capacity of the vessel during both non-alarm and alarm conditions.

Figure 2:
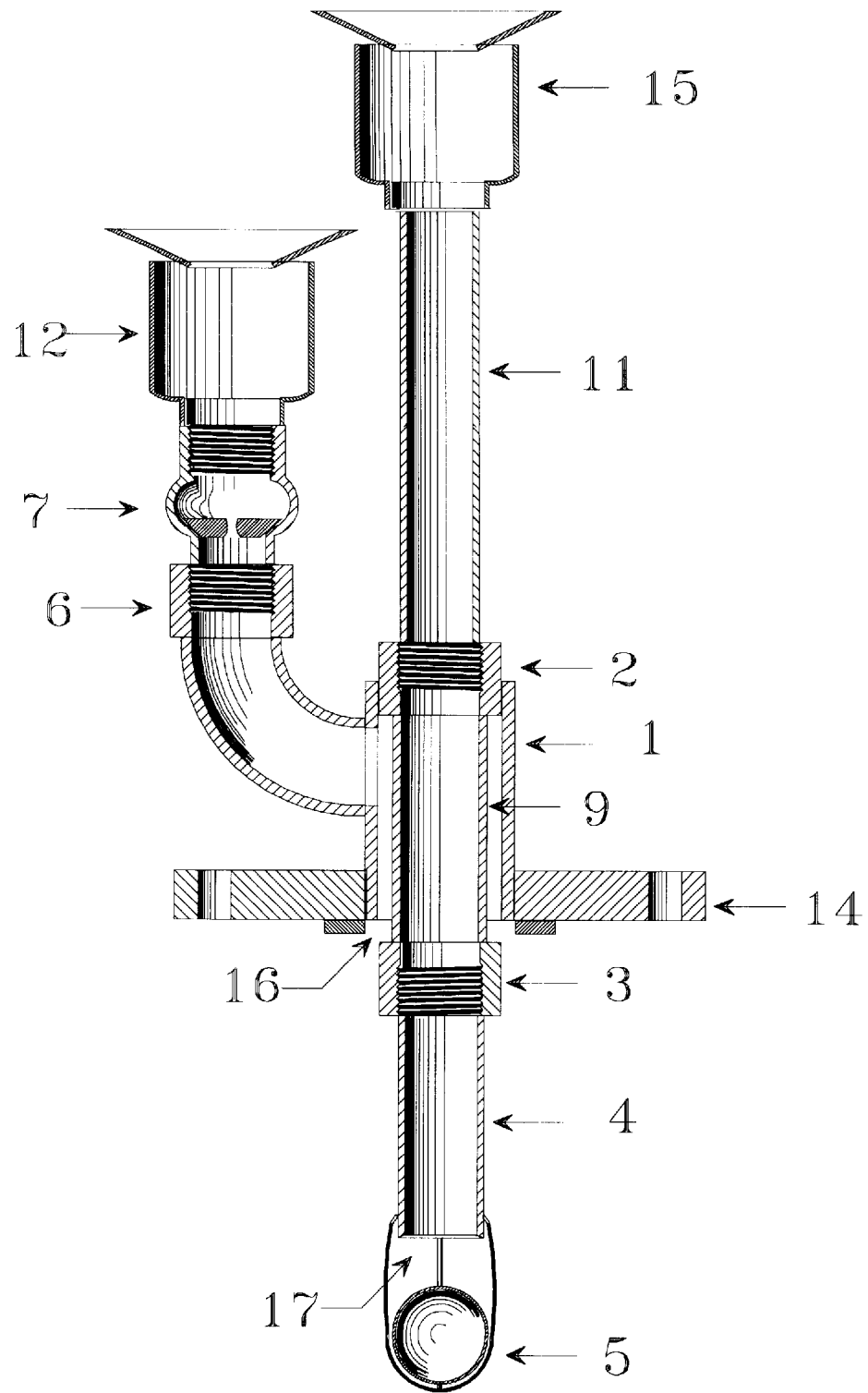
FIG. 2 is a perspective cut away view of the invention in a form for mounting on to a standard pipe flange.

FIG. 2 is a form of the invention provided with a pipe flange 14 (or any means to allow mounting to a standard pipe flange). Operation is the same.

Figure 3:
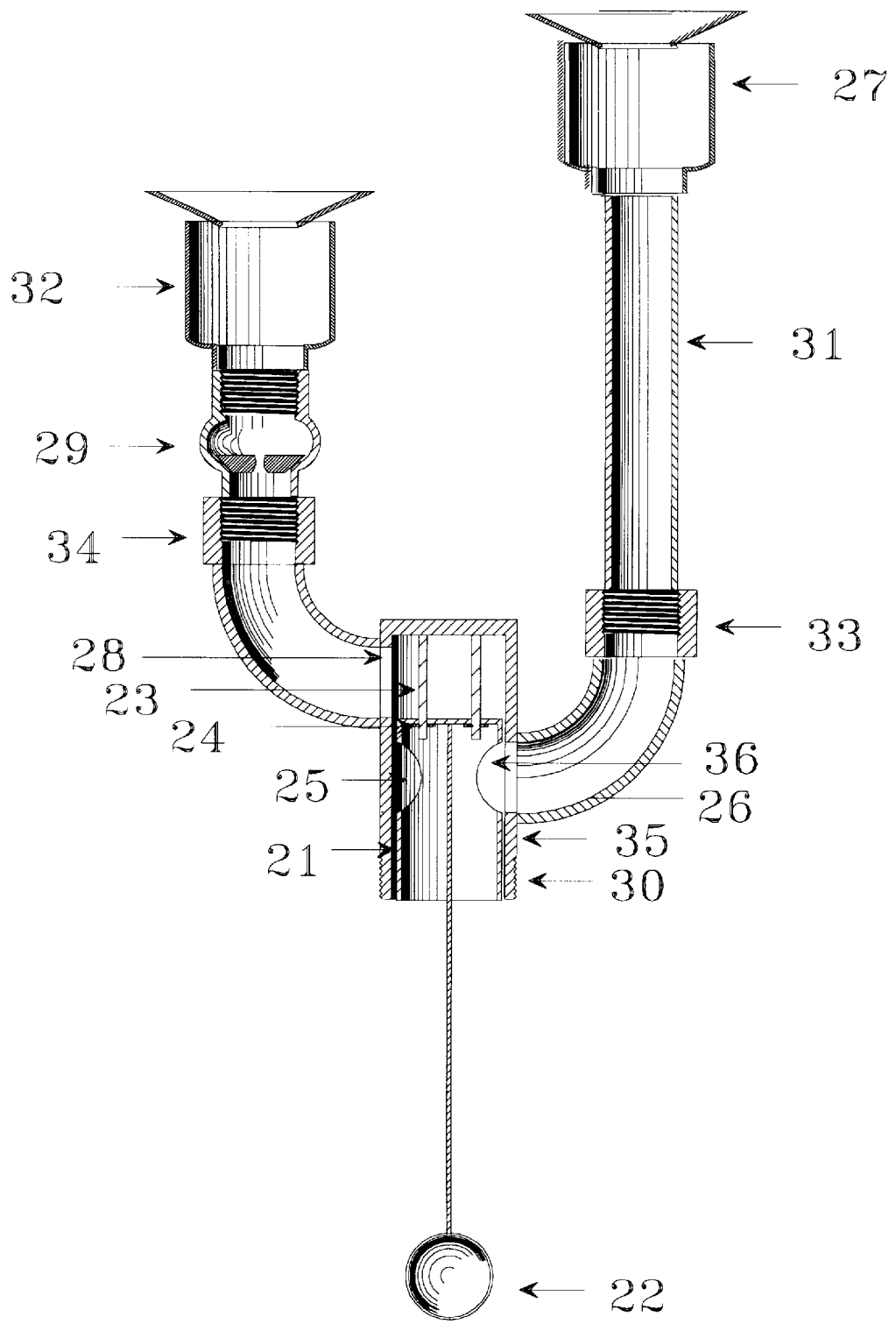
FIG. 3 is a perspective cut away view of an alternate form of the invention using an alternate method of routing the venting vapor through the means for sounding a whistle or alarm.

FIG. 3 is a modification of the invention which diverts the venting vapors to the means of sounding a whistle or alarm 29 by use of a sleeve 21 (or any means to redirect the venting vapors) mounted to a float 22 (or any means to provide a buoyant force). Guide pins 23 (or any means to establish lower stop points and prevent the sleeve from rotating out of alignment) and cotter pins or snap rings 24 (or any means to define the limits of travel) keep the sleeve 21 properly aligned. When the float 22 and the sleeve 21 are in the low position (normal non alarm position) port 36 in the sleeve 21 aligns with the opening 26 to the vent riser 31 and vent cap 27. When the float 22 and the sleeve 21 are in the high position (alarm position) port 25 in the sleeve 21 aligns with the opening 28 to the means of sounding a whistle or alarm 29 and vent cap 32. When the liquid level rises to the level of the float 22, the float 22 and the sleeve 21 rise until they reach the upper level where vapor begins to exit through port 25 to opening 28 to the means to sound the whistle or alarm. As the sleeve 21 rises, port 36 moves out of alignment with opening 26 decreasing the flow through the vent cap 27 and the flow through port 25 to opening 28 the means to sound the whistle or alarm increases. When the liquid level later decreases, the gravitational force on the float 22 and sleeve 21 repositions the means of redirecting the vapors to the lower level so that vapors again exit normally through port 36 to opening 26, vent riser 31, and vent cap 27.

FIG. 3 depicts the invention mounting with standard pipe threads 30. Use of a flange as shown as item 11 in FIG. 2 is an alternate mounting method. The sleeve 21 is enclosed in a housing 35 (or any means to house and attach the components). A vent riser 31 and vent cap 27 are connected to a pipe thread 33. The means to sound a whistle or alarm is connected to a standard pipe thread 34.

This invention as shown in FIGS. 1 & 2, includes the use of the pipe nipple 4 and a float 5 to close off the primary means of venting vapor, the means of directing vapor flow through an annular ring opening 16 to the means of sounding a whistle or alarm 7 and the incorporation of the means to sound a whistle or alarm 7 to produce the warning sound. The use of alternate types of means to sound a whistle or alarm which sound due to the vapor passing through them or means to block the vapor flow may be employed without departing from the spirit of the invention.

Figure 4:
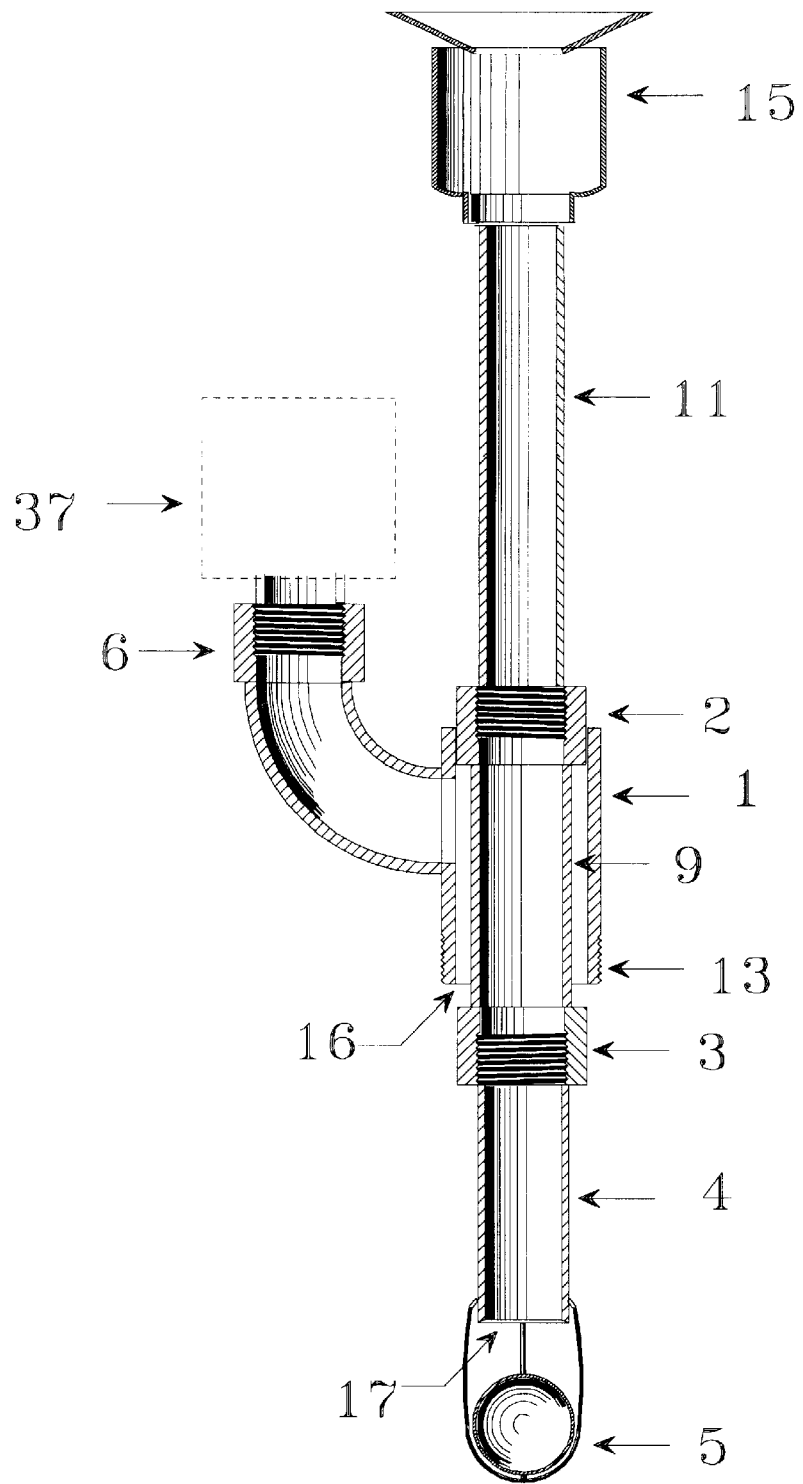
FIG. 4 is a perspective cut away view, identical in every way to FIG. 1 except for a alternate method of sounding and alarm or whistle combined with a means to prevent the intrusion of rain water.

FIG. 4 is a duplicate of FIG. 1 showing an empty box 37 (with no details) to represent any alternate device which may include one or more functions including a means to sound a whistle, a means to sound an alarm, a means to prevent the intrusion of rain water and/or a means to provide back pressure. This drawing is provided to emphasize that the means of providing for the above mentioned functions can be changed without departing from the spirit of the invention.

Our invention is primarily in the addition of a means to temporarily attach such a device to a flange or pipe. Additionally, the particular means to block the vapor flow 5 shown in FIGS. 1 and 2, and the means to redirect the vapor routing by use of a buoyant force 22, 21 of FIG. 3 are further improvements to the prior art float assemblies. As mentioned above they have the advantage of being easy to assemble from off the shelf parts and can provided as an unassembled kit.

We claim:

1. A storage vessel overfill alarm comprising:
   (a) a means of indicating a storage vessel is full and
   (b) a means of temporarily attaching the alarm to said storage vessel,
   wherein said means of indicating said storage vessel is full comprises
      a means of directing full venting of a displaced vapor or gases from said storage vessel being filled, said means of directing full venting directs full venting through a first means of discharging vapor when said storage vessel is not full and when said storage vessel is full, said means of directing full venting directs full venting through a second means of discharging vapor to a means of sounding an alarm, said first means of discharging vapor is a vent, said second means of discharging vapor has sides and has an opening through which escaping vapors enter, said sides form an annular ring space at said opening.

2. A storage vessel overfill alarm comprising:
   (a) a means of indicating a storage vessel is full and
   (b) a means of temporarily attaching the alarm to said storage vessel, said means of indicating said storage vessel is full comprises
      a float,
      a means to create an indication,
      at least two means of discharging vapor,
      at least two ports, and
      a stationary part having said at least two means of discharging vapor
      a means of directing vapor said means of directing vapor having said at least two ports, said means of directing vapor moves with respect to said stationary part and said means of directing vapor directs a vapor or gas through at least one of said at least two ports to at least one of said two means of discharging vapor,
   wherein said at least two ports are positioned by said means of directing vapor, said means of directing vapor is positioned by said float, ad said float is positioned by liquid level,
   and wherein when said storage vessel is not full said float positions said at least two ports such that escaping gas or vapor flows through a first of said at least two ports and then from said first of said at least two ports to a first of said at least two means of discharging vapor thereby allowing venting of said gas or vapor, while when said storage vessel is full, said float positions said at least two ports such that said gas or vapor flows through a second of said at least two ports and then from said second of at least two ports into a second of said at least two means of discharging vapor thereby directing said gas or vapor to activate said means of creating an indication to indicate that said storage vessel is full.

3. A storage vessel overfill alarm, as in claim 2, further comprising:
   guide pins and at least one means of limiting extent of travel of said means of directing vapor wherein said means of directing vapor is aligned by said guide pins, said means of directing vapor is limited in travel by said at least one means to limit extent of travel.

4. A storage vessel overfill alarm comprising:
   (a) a means of indicating a storage vessel is full and
   (b) a means of temporarily attaching said storage vessel overfill alarm to said storage vessel,
   wherein said means of indicating a storage vessel is full comprises
      a stationary part,
      at least two means of discharging vapor attached to said stationary part,
      a means of directing vapor having at least two ports, said means of directing vapor moves with respect to said stationary part, said means of directing vapor directs vapor through at least one of said at least two ports to at least one of said at least two means of discharging vapor,
      a means to select at least one of said at least two means of discharging vapor,
      a means to limit travel of said means to select,
      a means to align said means to select,
      a means of sounding an alarm activated by a flow of vapor,
      a means to prevent intrusion of rainwater into one of said at least two means of discharging vapor,
   wherein said means to select is positioned by a fluid's level, said fluid is that fluid which is stored in said storage vessel, said means to select positions said means of directing vapor thereby positioning said at least two ports,
   wherein when said storage vessel is not fill said means to select selects at least a first of said at least two means of discharging vapor by positioning said means of directing vapor, said means of directing vapor directs vapor through at least a first of said at least two ports to at least a first of said at least two means of discharging vapor, while when said storage vessel is full said means to select selects at least a second of said of at least two means of discharging vapor by positioning said means of directing vapor, said means of directing vapor directs vapor through at least a second of said at least two ports to at least a second of said at least two means of discharging vapor to said means of sounding said alarm, and wherein said means of temporarily attaching said storage vessel overfill alarm to said storage vessel comprises a means of attaching said storage vessel overfill alarm to a threaded opening on said storage vessel.

5. A storage vessel overfill alarm comprising:

(a) a means of indicating a storage vessel is full and (b) a means of temporarily attaching said storage vessel overfill alarm to said storage vessel, wherein said means of indicating a storage vessel is full comprises a vent riser forming one route for normal venting before said storage tank is full, a ball float and seat to shut off vapor flow through said one route at a high level, a housing to redirect vapors, between said housing and said vent riser, an annular ring opening is formed to allow passage of redirected vapors to an alternate outlet, a whistle or alarm that sounds when vapors or gases pass through it, and a vent cap to prevent intrusion of rainwater wherein when said storage tank is not full said ball float rests in said seat and allows venting vapors to escape through said vent riser and then to said vent cap and out said storage vessel overfill alarm, while when said storage vessel is full said ball float blocks said vent riser and escaping vapors enter said annular opening and escape through said alternate outlet said alternate outlet having said whistle or alarm, and wherein said means of temporarily attaching said storage vessel overfill alarm to said storage vessel comprises a threaded connection to allow attachment of said storage vessel overfill alarm to a threaded opening on said storage vessel.

6. A storage vessel overfill alarm comprising:

(a) a means of indicating a storage vessel is full and (b) a means of temporarily attaching said storage vessel overfill alarm to said storage vessel, wherein said means of indicating a storage vessel is full comprises a vent riser forming one route for normal venting before said storage tank is full a ball float and seat to shut off vapor flow through said one route at a high level, a housing to redirect vapors, between said housing and said vent riser an annular ring opening is formed to allow passage of redirected vapors to an alternate outlet, a whistle or alarm that sounds when vapors or gases pass through it, and a vent cap to prevent intrusion of rainwater wherein when said storage tank is not full said ball float rests in said seat and allows venting vapors to escape through said vent riser and then to said vent cap and out said overfill alarm, while when said storage vessel is full said ball float blocks said vent riser and escaping vapors enter said annular ring opening and escape through said alternate outlet, said alternate outlet having said whistle or alarm, and wherein said means of temporarily attaching said overfill storage vessel alarm to said storage vessel comprises a flanged connection to allow attachment of said storage vessel overfill alarm to a flange.

7. A storage vessel overfill alarm comprising:

(a) a means of indicating a storage vessel is full and (b) a means of temporarily attaching said storage vessel overfill alarm to said storage vessel, wherein said means of indicating a storage vessel is full comprises a float for buoyant force, a sleeve with at least two ports, connected to said float a means to produce a whistle when vapors or gases pass through it, a vent, said vent having:

a vent riser and a vent cap to prevent intrusion of rainwater, into said vent riser a housing to enclose said sleeve, said housing having a means to allow attachment of said vent riser, said housing having a means to attach said means to sound a whistle or alarm and said housing having at least two openings for discharged vapors, guide pins attached to said housing to align said sleeve, at least one means to limit extent of travel of said sleeve wherein said float is positioned by a fluid's level, said fluid is that fluid which is stored in said storage tank, said float moves said sleeve thereby moving said at least two ports, said sleeve travels within said housing while said guide pins prevent said sleeve from rotating wherein when said storage vessel is not full said float moves said sleeve and thereby moves said two ports while said guide pins align said two ports such that said vapor or gas flows from said sleeve through a first of said two ports and then into said vent riser, then through said vent riser to said vent cap, said vent cap then directs said vapor or gas out of said storage vessel, when said storage vessel is full said float pushes said sleeve and thereby said two ports while said guide pins align said at least two ports such that said escaping vapor or gas flows from said sleeve through a second of said two ports to said means to sound a whistle thereby producing a whistle as said vapors or gases pass through it, said at least one means of limiting extent of travel prevents said second of said two ports from passing said means to sound a whistle, and wherein said means of temporarily attaching said overfill storage vessel alarm to said storage vessel comprises a threaded connection to permit mounting of said storage vessel overfill alarm to a thread opening in said storage vessel.

8. A storage vessel overfill alarm comprising:

(a) a means of indicating a storage vessel is full and (b) a means of temporarily attaching said overfill storage vessel alarm to said storage vessel, wherein said means of indicating a storage vessel is full comprises a float for buoyant force, a sleeve with at least two ports for vapor discharge alternatives connected to said float, a means to sound a whistle when vapors or gases pass through it, a vent riser, a vent cap, a housing to enclose said sleeve, said housing having a means for attachment of said vent riser, and said housing having a means for attachment of said means to sound a whistle, guide pins attached to said housing to align said sleeve, at least one means of limiting extent of travel of said sleeve, wherein said vent cap prevent intrusion of rain water into said vent riser, wherein said float is positioned by a fluid's level, said fluid is that fluid which is stored in said storage tank, said float moves said sleeve thereby moving said at least two ports, said sleeve travels within said housing while said guide pins prevent said sleeve from rotating wherein when said storage vessel is not full said float moves said sleeve and thereby moves said two ports while said guide pins align said two ports such that said vapor or gas flows from said sleeve through a first of said two ports and then into said vent riser, then through said vent riser out of said vent riser, where said vent cap directs said vapor or gas out of said storage vessel, when said storage vessel is full said float pushes said sleeve and thereby said two ports while said guide pins align said at least two ports such that said escaping vapor or gas flows from said sleeve through a second of said two ports to said means to sound a whistle thereby producing a whistle as said vapors or gases pass through it, said at least one means of limiting extent of travel prevents said second of said two ports from passing said means to sound a whistle, and wherein said means of temporarily attaching said overfill storage vessel alarm to said storage vessel comprises a flanged connection to permit mounting of said storage vessel overfill alarm to a flange opening in said storage vessel.

9. A storage vessel overfill alarm comprising:

(a) a means of indicating a storage vessel is full and (b) a means of temporarily attaching said overfill storage vessel alarm to said storage vessel, wherein said means of indicating said storage vessel is full comprises a means of sounding an alarm two concentric passage ways for the flow of vapor or gases formed by concentric cylindrical tubes, said two concentric passage ways defining a first pasage way and a second passage way, means for connecting said second passageway to said means of sounding an alarm, a means of preventing flow of said vapor or gas through said first passage way, said means of preventing flow is activated by a fluid level of said storage vessel wherein when said storage vessel is being filled but is not yet full, said means of preventing flow allows said vapor or gas to flow through said first passage way, then said first passage way allows said vapor or gas to vent and when said storage vessel is full but still filling, said means of preventing flow prevents said vapor or gas from flowing through said first passage way, wherein said vapor or gas flows through said second passage way, said second passage way and said connecting means allow said vapor or gas to pass through said means of sounding an alarm.

10. A storage vessel overfill alarm as described in claim 3, wherein said means of limiting the extent of travel is a cotter pin.

11. A storage vessel overfill alarm, as described in claim 3, wherein said means of limiting the extent of travel is a snap ring.

12. A storage vessel overfill alarm, as described in claim 7, wherein said means of limiting the extent of travel is a cotter pin.

13. A storage vessel overfill alarm, as described in claim 7, wherein said means of limiting the extent of travel is a snap ring.

14. A storage vessel overfill alarm, as described in claim 8, wherein said means of limiting the extent of travel is a cotter pin.

15. A storage vessel overfill alarm, as described in claim 8, wherein said means of limiting the extent of travel is a snap ring.

* * * * *